United States Patent
Forood et al.

(10) Patent No.: US 7,111,017 B1
(45) Date of Patent: Sep. 19, 2006

(54) DYNAMIC DEVICE MANAGEMENT AND DEPLOYMENT

(75) Inventors: Natalie Forood, Burlingame, CA (US); Jeff Ronne, Cupertino, CA (US); Jiang Wu, Union City, CA (US); Manish M. Rathi, San Jose, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 340 days.

(21) Appl. No.: 10/062,633

(22) Filed: Jan. 31, 2002

(51) Int. Cl.
*G06F 17/00* (2006.01)
*G06F 7/00* (2006.01)

(52) U.S. Cl. .................... 707/104.1; 707/10
(58) Field of Classification Search ............. 707/104.1, 707/100, 10; 709/229; 345/440
See application file for complete search history.

(56) References Cited

U.S. PATENT DOCUMENTS

| | | | |
|---|---|---|---|
| 5,729,741 A * | 3/1998 | Liaguno et al. | 707/104.1 |
| 6,163,806 A * | 12/2000 | Viswanathan et al. | 709/229 |
| 6,597,471 B1 * | 7/2003 | Yoshikawa | 358/1.2 |
| 6,609,843 B1 * | 8/2003 | Mahoney et al. | 400/70 |
| 2001/0024444 A1 * | 9/2001 | Asai | 370/401 |
| 2002/0030833 A1 * | 3/2002 | Kuwata et al. | 358/1.9 |
| 2002/0059278 A1 * | 5/2002 | Bailey et al. | 707/100 |
| 2002/0063901 A1 * | 5/2002 | Hicks | 358/302 |
| 2003/0014422 A1 * | 1/2003 | Notargiacomo et al. | 707/102 |
| 2003/0050718 A1 * | 3/2003 | Tracy et al. | 700/91 |

FOREIGN PATENT DOCUMENTS

DE  10111434 A1 * 10/2001

OTHER PUBLICATIONS

"Calibrating imaging system involves setting image processing criterion to reduce difference between predetermined attribute and attribute of image", Gennetten et al., Deutsches Patent, DE 10111434A1, Oct. 18, 2001 (Abstract only).*

* cited by examiner

*Primary Examiner*—John R. Cottingham
*Assistant Examiner*—Kuen S. Lu
(74) *Attorney, Agent, or Firm*—Blakely, Sokoloff, Taylor & Zafman LLP

(57) ABSTRACT

A network management application (NMA) obtains identification information identifying a network device. The NMA searches a storage area for a directory corresponding to the identification information. When the NMA locates the directory corresponding to the identification information, the NMA searches the directory for a file containing descriptions of the attributes of the network device. When the NMA locates the file containing the attribute descriptions, the NMA generates an image of the network device in accordance with the attribute descriptions.

28 Claims, 5 Drawing Sheets

DYNAMIC DEVICE MANAGEMENT AND DEPLOYMENT

FIELD OF THE INVENTION

The invention relates to network devices. In particular, the invention relates to generating images of network devices and any corresponding textual information by using a predefined high level language to represent various attributes of network devices.

BACKGROUND OF THE INVENTION

A network is a group of two or more network devices linked by wired or wireless connections. A network device is an electronic system, e.g., a desktop computer, a personal digital assistant, a mobile or laptop computer, a cellular or mobile telephone, etc., that is accessible by or over a network.

A network management application (NMA) is a computer program used to manage network devices. The NMA can run as a stand-alone application either on a server, i.e., a network device that provides data to another network device, or on a client, i.e., a network device that receives data from a server. In some instances, many thousands of clients request data from the same server.

As part of the network management process, a computer program known as an agent gathers data regarding the operating status of a network device. The data includes information regarding specific components of the network device, for example, that a port (i.e., an interface on an electronic device used to connect another device to the electronic device) is defective. The agent transmits the operating status data to a database, where the data is stored until retrieved by an NMA.

A person can access a client and view an image, and any corresponding textual information, conveying the operating status of a network device. When accessed for this purpose, the client requests an image of the network device from the server running the network's NMA. Typically, the NMA is written to include instructions for generating images of various network devices and their components and any corresponding textual information. For example, the instructions include data regarding the shapes and locations of the network device's ports. Consequently, when a network device running an NMA receives the request for the image conveying the operating status of a particular network device, the NMA retrieves the network device's operating status data from a database and generates the image and any corresponding textual information. The network device running the NMA displays the image on a flat-panel display device such as a cathode ray tube (CRT).

When an NMA is written to include instructions for generating images of network devices, the NMA cannot generate an image of a particular network device or any corresponding textual information unless the NMA includes instructions for generating images of that network device and its components and any corresponding textual information. When one or more new devices added to a network are developed after the release of the NMA running on the network's server, the NMA will not contain instructions for generating an image of any newly developed network devices or any corresponding textual information.

In order for the NMA to generate images (and any corresponding textual information) of network devices developed after the release of the NMA, the NMA is rewritten to include instructions for generating such images and textual information. Subsequently, a revised version of the NMA is released. The NMA is rewritten on multiple occasions when network devices are developed periodically over time after various releases of the NMA. Rewriting an NMA so that it can generate images (and any corresponding textual information) of newly developed network devices consumes a great deal of time and resources. In addition, if a defect is identified in the NMA after its release, significant code changes are required in order to correct the defect.

SUMMARY

According to one aspect of the present invention, a method is provided in which network devices are dynamically managed and deployed. A network management application (NMA) obtains information identifying a network device. The NMA searches a storage area for a directory named according to the identification information. When the NMA locates the directory corresponding to the identification information, the NMA searches the directory for a file containing descriptions of the attributes of the network device. When the NMA locates the file containing the attribute descriptions, the NMA generates an image of the network device in accordance with the attribute descriptions.

In accordance with other aspects of the present invention, apparatuses are provided to carry out the above and other matters.

In addition to the aspects and advantages described further aspects and advantages of the invention will become apparent by reference to the drawings and the reading of the detailed description that follows.

BRIEF DESCRIPTION OF DRAWINGS

The invention is illustrated by way of example, and not by way of limitation, in the figures of the accompanying drawings in which like reference numerals refer to similar elements.

DETAILED DESCRIPTION OF THE INVENTION

Figure 1:
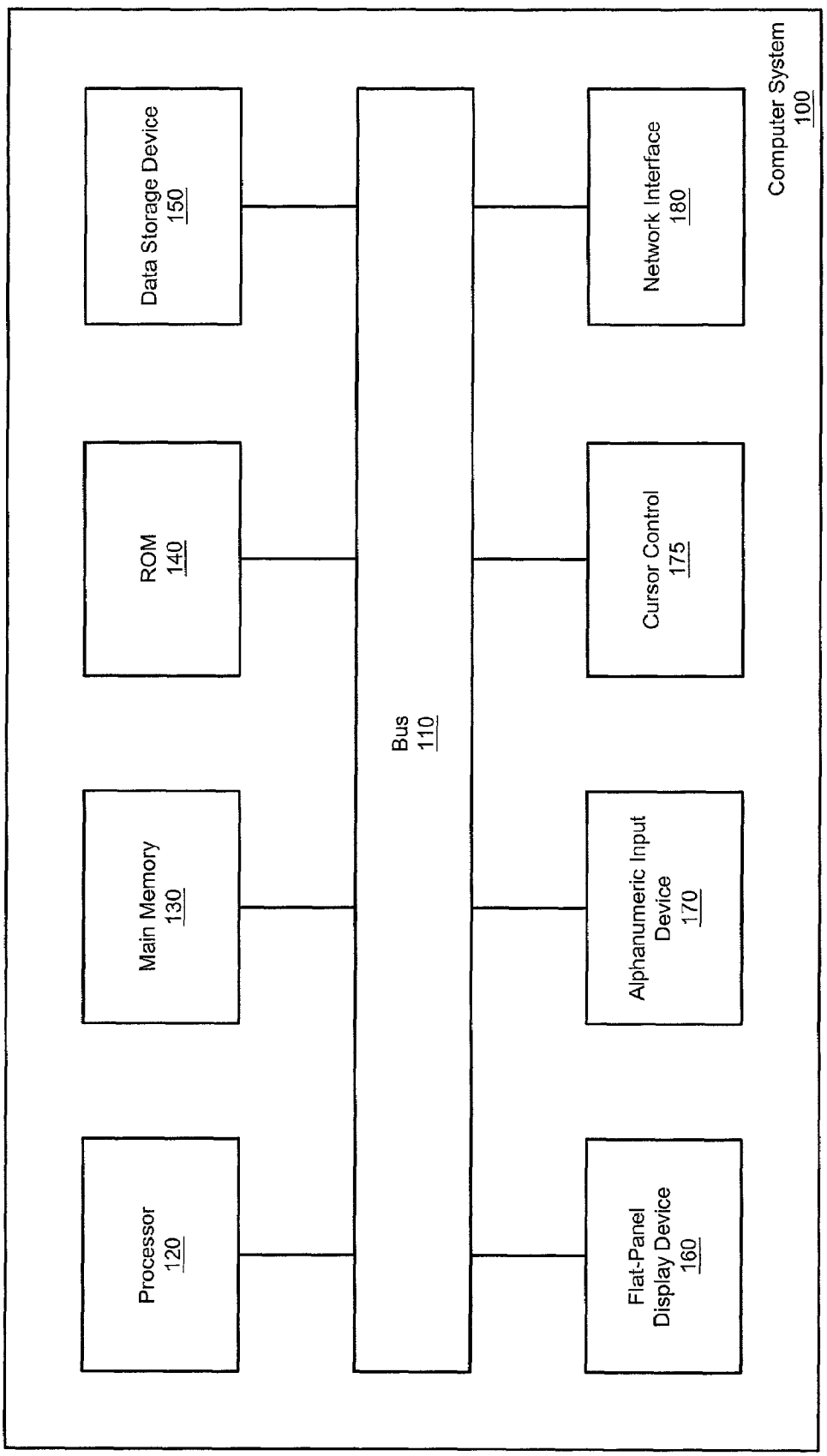
FIG. 1 is a block diagram of an electronic system in which certain aspects of the invention illustrated FIGS. 2–4 may be practiced.

A method of generating images of network devices and any corresponding textual information is described. In the following description, numerous specific details are provided for a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

According to the invention, a network management application (NMA) is written so that it accesses files containing information needed to generate images, as well as textual information regarding specific aspects (e.g., manufacturer's name, model number, Boot ROM version, etc.), of network devices managed by the NMA. As a result, information needed to generate images (and any corresponding textual information) of network devices developed after the release of the NMA can be stored in files accessible by the NMA. Thus, the invention provides an alternative to writing an NMA to include instructions for generating images of network devices and any corresponding textual information, which eliminates the need to rewrite the NMA to add instructions for generating images (and any corresponding textual information) of network devices developed after the release of the NMA.

In order for an NMA to generate either or both an image of a network device or any textual information corresponding to the network device (referred to herein collectively as an image of a network device and any corresponding textual information) in accordance with the invention, the files used by the NMA to generate images of network devices and any corresponding textual information are loaded onto a network's server. The files include configuration files and image files. The configuration files contain descriptions of the attributes of network devices, e.g., the number and locations of ports, the shape of a port, the shape and location of a power supply, etc. A pre-defined high level programming language is used to represent the descriptions of the attributes. The configuration files also contain references to the image files, which contain images of the attributes. Configuration files may contain references to directories related to attributes shared by multiple network devices (herein referred to as shared attributes).

When loaded onto the server, the configuration files and image files are stored in directories whose names are based on the object identifiers (OIDs) of the network devices which the NMA is capable of managing and the enterprise identifiers of the manufacturers of the network devices. An OID is a sequence of integers separated by periods that uniquely identifies a device, e.g., 1.3.6.1.4.1.1916.2.8. See, e.g., International Telecommunications Union-Telecommunication (ITU-T) Recommendation X.680 Amendment 1 (6/99) Relative Object Identifiers. Enterprise identifiers are assigned to network device manufacturers, and each manufacturer uses its enterprise identifier as the basis for OIDs that are assigned to the network devices produced by the manufacturer. For example, when the manufacturer's enterprise identifier is 1916, the OID 1.3.6.1.4.1.1916.2.8 can be assigned to a network device produced by the manufacturer. OIDs are well-known to those of ordinary skill in the art, and thus will not be discussed further except as they pertain to the present invention. Naming the directories based on OIDs (or other information relevant to network devices and their manufacturers) enables an NMA to locate a particular network device's directory or a manufacturer's directory when the NMA obtains the network device's Configuration files and image files relating to the specific attributes of a particular network device are stored in a directory named according to the OID of the network device. Configuration files and image files relating to a network device manufacturer's generic device are stored in a directory corresponding to the manufacturer's enterprise identifier. Configuration files and image files relating to shared attributes are stored in directories (referred to herein as a shared directory or shared directories, as applicable) named according to a predefined set of names (e.g., oid_1916.stackable, oid_1916.Unknown, etc.).

Default configuration files and image files that enable an NMA to generate an image and any corresponding textual information regarding a network device for which specific or generic files do not exist are stored in a default directory. The NMA defaults to the default directory when the NMA cannot locate a directory named according to the OID obtained by the NMA in connection with a request for an image of particular network device.

After the files are loaded onto the server, a packaging event occurs, e.g., causing the server to shut down and restart. As a result, the configuration files and image files are packaged into one main file on the server. When a client must generate an image of a network device and any corresponding textual information, the client requests the main file from the server.

The client downloads the main file from the server. The client stores the files and directories contained in the main file in a cache or other storage area of the client. Consequently, the NMA running on the client can access the configuration files and image files and dynamically generate images of network devices and any corresponding textual information without having to access the server. This eliminates performance issues that arise when a client must repeatedly obtain information from a server.

In order to generate an image of a network device, and any corresponding textual information, for which an image is requested (referred to herein as the requested device), e.g., by a person wanting to view an image of the requested device, the NMA obtains the OID of the requested device. The NMA searches the client for a directory corresponding to the OID of the requested device (herein referred to as an OID directory). When the NMA locates the OID directory, the NMA locates the configuration file (herein referred to as the requested device configuration file) within the OID directory. The NMA accesses the requested device configuration file to determine the specific attributes of the requested device. While in the requested device configuration file, the NMA also determines the location of image files containing images of the specific attributes described in the requested device configuration file. In addition, the NMA determines the location of any shared directories containing shared attributes of the requested device. After accessing the requested device configuration file, the NMA accesses the image files referenced in the requested device configuration file.

When the NMA does not locate an OID directory, the NMA searches for the directory (referred to as the generic directory) named according to the OID of the requested device's manufacturer. The generic directory contains the configuration file and image file for a generic device produced by the manufacturer of the requested device, which is used to represent the requested device since the NMA cannot locate files for the requested device.

When the NMA locates the generic directory, the NMA locates the configuration file within the generic directory (herein referred to as the generic device configuration file).

The NMA accesses the generic device configuration file to determine the generic attributes of the generic device. While in the generic device configuration file, the NMA also determines the location of image files containing images of the generic attributes. In addition, the NMA determines the location of any shared directories containing shared attributes of the generic device. After accessing the generic device configuration file, the NMA accesses the image files referenced in the generic device configuration file.

After accessing the image files of the requested device or the generic device, as applicable, the NMA searches for any shared directories containing shared attributes referenced in the requested device configuration file or generic device configuration file. When the NMA locates any shared directories, the NMA locates the configuration file (herein referred to as a shared configuration file) within the shared directory. The NMA accesses the shared configuration file to determine the shared attributes of the requested device or the generic device, as applicable. While in the shared configuration file, the NMA also determines the location of image files containing images of the shared attributes. After accessing the shared configuration file, the NMA accesses the image files referenced in the shared configuration file. The NMA uses the descriptions of the specific attributes or the generic attributes, and the descriptions of any shared attributes, along with the related images from the image files, to generate an image of a network device or a generic device and any corresponding textual information.

When the NMA does not locate an OID directory or a generic directory related to a requested device, the NMA defaults to the default directory. The NMA accesses the configuration file (herein referred to as the default configuration file) located in the default directory. The default configuration file contains text, such as "Unknown Device," pertaining to the inability of the NMA to locate attributes for the network device and a reference to the location of an image file containing an image used in connection with unknown devices. After accessing the default configuration file, the NMA accesses the image file referenced in the default configuration file. The NMA uses the information in the default configuration file and the related image from the image file to generate an image relating to an unknown device and any corresponding textual information.

FIG. 1 is a block diagram of one embodiment of an electronic system in which certain aspects of the invention may be practiced. In one embodiment, the invention described herein can be implemented as sequences of instructions executed by an electronic system. The sequences of instructions can be stored by the electronic system. In addition, the instructions can be received by the electronic system (e.g., via a network connection). The electronic system is intended to represent a range of machines, including, for example, a personal digital assistant (PDA), a laptop or palmtop computer, a cellular phone, a network access device, etc. Other electronic systems can include more, fewer and/or different components.

Electronic system 100 includes a bus 110 or other communication device to communicate information, and processor 120 coupled to bus 110 to process information. While electronic system 100 is illustrated with a single processor, electronic system 100 can include multiple processors and/or co-processors.

Electronic system 100 further includes random access memory (RAM) or other dynamic storage device 130 (referred to as memory), coupled to bus 110 to store information and instructions to be executed by processor 120. Memory 130 also can be used to store temporary variables or other intermediate information while processor 120 is executing instructions. Electronic system 100 also includes read-only memory (ROM) and/or other static storage device 140 coupled to bus 110 to store static information and instructions for processor 120. In addition, data storage device 150 is coupled to bus 110 to store information and instructions. Data storage device 150 may comprise a magnetic disk (e.g., a hard disk) or optical disc (e.g., a CD-ROM) and corresponding drive.

Electronic system 100 may further comprise a flat-panel display device 160, such as a cathode ray tube (CRT) or liquid crystal display (LCD), to display information to a user. Alphanumeric input device 170, including alphanumeric and other keys, is typically coupled to bus 110 to communicate information and command selections to processor 120. Another type of user input device is cursor control 175, such as a mouse, a trackball, or cursor direction keys to communicate direction information and command selections to processor 120 and to control cursor movement on flat-panel display device 160. Electronic system 100 further includes network interface 180 to provide access to a network, such as a local area network.

Instructions are provided to memory from a machine-accessible medium, or an external storage device accessible via a remote connection (e.g., over a network via network interface 180) providing access to one or more electronically-accessible media, etc. A machine-accessible medium includes any mechanism that provides (i.e., stores and/or transmits) information in a form readable by a machine (e.g., a computer). For example, a machine-accessible medium includes RAM; ROM; magnetic or optical storage medium; flash memory devices; electrical, optical, acoustical or other form of propagated signals (e.g., carrier waves, infrared signals, digital signals); etc.

In alternative embodiments, hard-wired circuitry can be used in place of or in combination with software instructions to implement the present invention. Thus, the present invention is not limited to any specific combination of hardware circuitry and software instructions.

Figure 2:
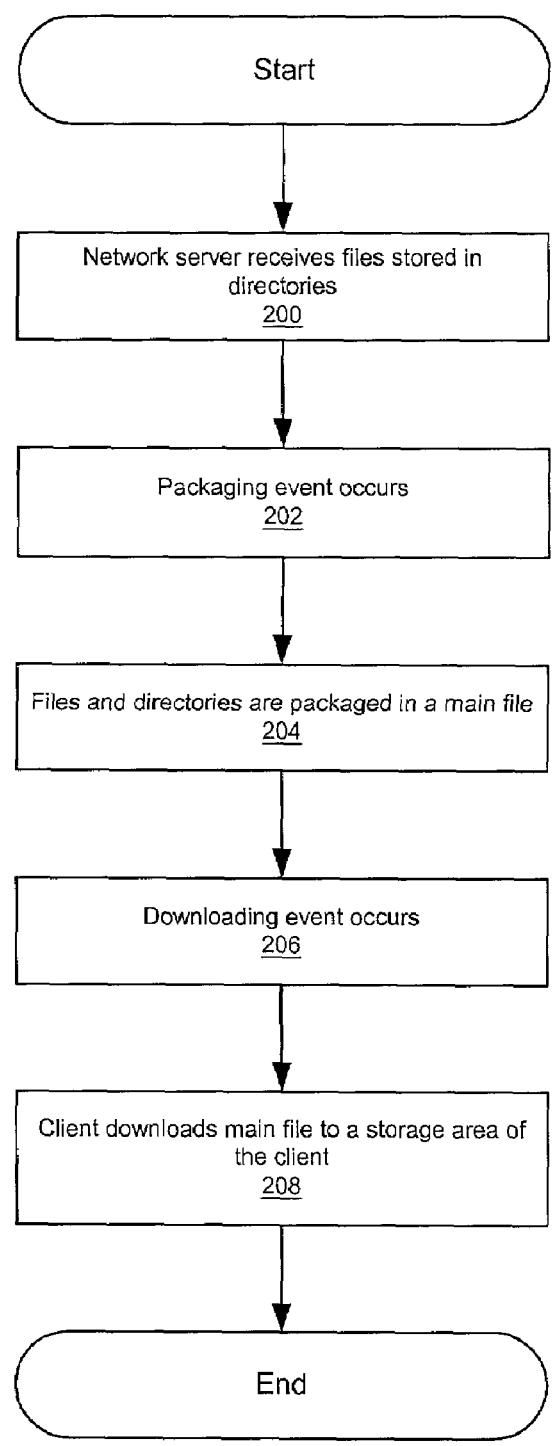
FIG. 2 is a flow diagram of one embodiment of providing files used to generate images of network devices and any corresponding textual information in accordance with the invention.

Turning now to FIGS. 2 and 3, the particular methods of the invention are described in terms of computer software with reference to a series of flowcharts. The methods to be performed by an electronic system constitute computer programs made up of machine-executable instructions. Describing the methods by reference to a flowchart enables one skilled in the art to develop such programs including such instructions to carry out the methods on suitably configured machines (the processor of the machine executing the instructions from machine-accessible media). The machine-executable instructions may be written in a programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application . . . ), as taking an action or causing a result. Such expressions are merely a shorthand way of saying that execution of the software by a machine causes the processor of the machine to perform an action or a produce a result.

FIG. 2 illustrates certain aspects of the method of providing files accessed by an NMA to generate images of network devices and any corresponding textual information. In particular, FIG. 2 illustrates some of the acts to be performed by a client running an NMA that incorporates one embodiment of the invention. At 200, a network server receives files stored in directories. In one embodiment, the files are loaded onto the server from a removable storage medium such as a CD-ROM as part of the product distribution containing information regarding devices (e.g., newly developed devices) for which information was not provided in the original release of the NMA. In another embodiment, the files are received from another source, e.g., a wired or wireless network such as the Internet.

In one embodiment, the files received by the server contain descriptions of the attributes of network devices and images of the attributes. The attributes include physical attributes and/or non-physical attributes. Examples of physical attributes include whether the network device is modular or stackable, types of interfaces, the numbers, locations and shapes of the network device's components. Components include, for example, expansion slots, ports, and power supplies. An example of a non-physical attribute is BootRom support (BootRom is a small read-only-memory (ROM) device that contains the instructions needed to start up an electronic device.) Non-physical attributes can be used by the NMA to configure various aspects of the network device and provide the basis of any textual information corresponding to the network device. Although in one embodiment, the files contain descriptions of the attributes of network devices and images of the attributes, the files received by the server can contain additional, less or different information, e.g., textual information or a tabular display of attributes.

In one embodiment, the files received by the server include configuration files written in Extendable Markup Language (XML) format and image files written in Graphics Interchange Format (GIF). See, e.g., Extensible Markup Language (XML) 1.0 (Second Edition) W3C Recommendation, 6 Oct. 2000; and Graphics Interchange Format, Version 89a (modified), Programming Reference, GIF89M.TXT (Jan. 9, 1995). XML files and GIF files are well-known to those of ordinary skill in the art, and thus will not be discussed further except as they pertain to the present invention. The configuration files contain XML tags describing the attributes of the network devices and XML tags identifying image files that contain images of the attributes. The NMA understands the XML tags and thus can determine the attributes of a network device and identify files containing images of the attributes. Thus, for example, a configuration file contains one XML tag describing the coordinates of the location of an expansion slot in an image of a network device, and another XML tag identifying an image file containing an image of the expansion slot.

Although in one embodiment configuration files are written in XML format, configuration files can be written in another format, e.g., Extensible Hypertext Markup Language (XHTML), that provides the benefits related to eliminating the need to rewrite the NMA in connection with newly developed network devices. See, e.g., XHTML 1.0: The Extensible HyperText Markup Language, A Reformulation of HTML 4 in XML 1.0, W3C Recommendation, 26 Jan. 2000. In addition, although in one embodiment configuration files identify image files written in GIF format, image files can be written in another format, e.g. Joint Photographic Experts Group (JPEG) format, providing an image of a network device. See, e.g. ITU-T T.81 (9/92) Information Technology—Digital Compression and Coding of Continuous-Tone Still Images—Requirements and Guidelines.

In one embodiment, the files are stored in directories arranged according to the OIDs of the network devices to which the files correspond, and the enterprise identifiers of the manufacturers of those network devices. In other embodiment, the directories can be arranged according to other information, e.g., the serial numbers or other information that uniquely identifies devices, that enables an NMA, having obtained the information, to locate a particular network device's or manufacturer's directory.

Files relating to network devices that will be requested devices are stored in directories corresponding to information regarding the network device. In one embodiment, configuration files and image files relating to the specific attributes of a network device are stored in a directory identified by the OID of the network device. Specific attributes are attributes related solely to the requested network device, rather than to any other network device for which configuration files exist.

Files relating to alternative devices, i.e., devices for which directories are searched when directories corresponding to information regarding requested devices cannot be located, are stored in alternative directories, i.e., directories for which the NMA searches when requested directories cannot be located. In one embodiment, configuration files and image files relating to a manufacturer's generic device are stored in a directory named according to the manufacturers' enterprise identifier. A manufacturer's generic device is a basic device that is representative of the types of network devices produced by the manufacturer. The generic device may be the only network device produced by the manufacturer, or the base model of other network devices produced by the manufacturer, or a prototype of a network device the manufacturer has yet to produce.

Files relating to shared attributes are stored in directories identified according to a predetermined naming convention. In one embodiment, configuration files containing descriptions of shared attributes, as well as image files containing images of the shared attributes, are stored in shared directories identified according to a predefined naming convention based on OIDs. Shared attributes are attributes that are related to multiple network devices for which configuration files exist. For example, for an attribute shared by two network devices produced by a manufacturer whose enterprise identifier is 1916, configuration files and image files relating to the shared attribute are stored in a directory named according to the predefined directory name, e.g., "oid__1916.stackable." Identifying directories according to a predefined naming convention, e.g., naming directories based on OIDs, facilitates grouping of shared attributes for each network device, and facilitates associating alternative devices with requested devices.

Files that enable the NMA to generate a default image regarding network devices for which the NMA can locate neither a directory corresponding to the information regarding a network device nor a generic directory are stored in the default directory.

At 202, a packaging event occurs. In one embodiment, the packaging event occurs as a result of server starting up, i.e., the server starting up is the packaging event. However, the packaging event can occur in a different manner, e.g., programming the server to download files to the client based on the time elapsed since the most recent download of files, or based on a difference in the package contents. As a result of the packaging event, at 204 the files and directories previously received by the server are packaged into one main file. In one embodiment, the files and directories are packaged into a file compressed with the ZIP data compression format. Files compressed with the ZIP data compression format are well-known to those of ordinary skill in the art, and thus will not be discussed further except as they pertain to the present invention.

At 206, a downloading event occurs. In one embodiment, the downloading event occurs when a client running an NMA requests from the server data that will enable the NMA to generate images of requested devices and any corresponding textual information. As a result of the downloading event, at 208 the client downloads the main file from the server to a storage area of the client. In one embodiment, the client downloads the main file to a cache of the client. In another embodiment, the main file can be downloaded to a location, other than the client, that is accessible by the NMA. Although in one embodiment files are received by a server that packages the files and directories so that a client running the NMA can download the files and directories, the files can be received by a server running the NMA, thus eliminating the packaging and downloading of the files. Although in one embodiment the files and directories are packaged prior to downloading, in another embodiment, the files and directories can be downloaded without being packaged.

Figure 3A:
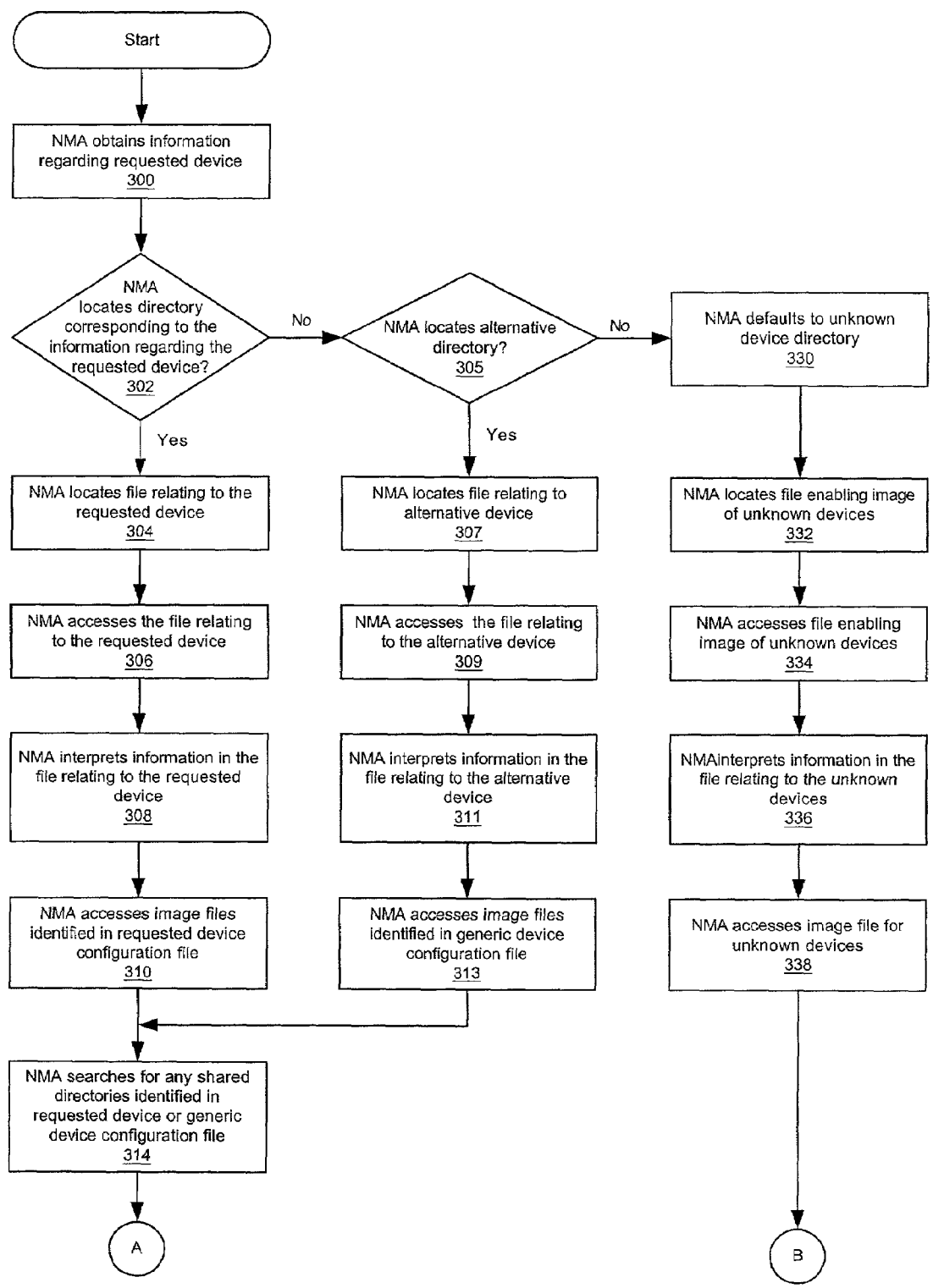
FIGS. 3A and 3B are a flow diagram of one embodiment of generating an image of a network device and any corresponding textual information in accordance with the invention.
Figure 3B:
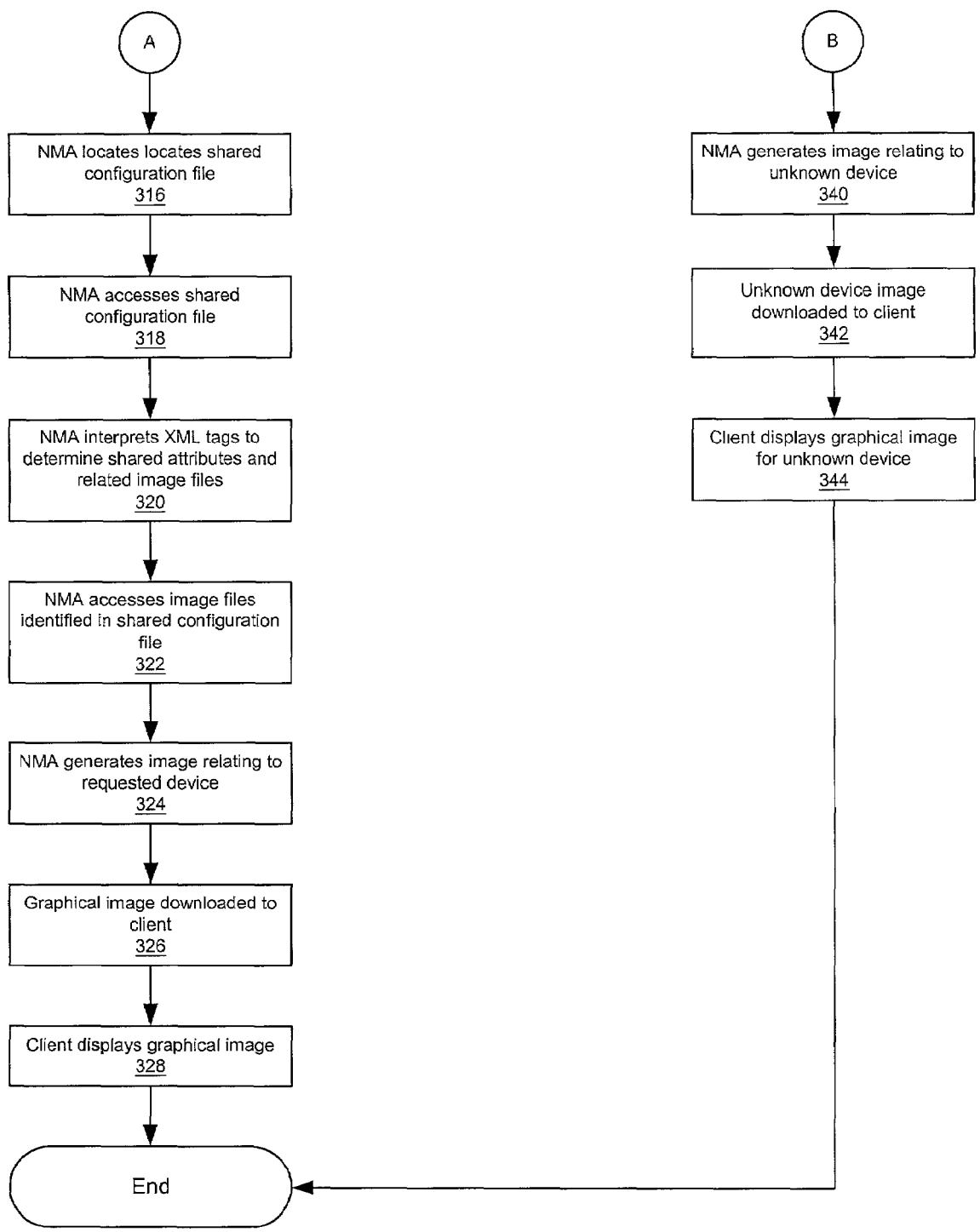

FIGS. 3A and 3B are a flow diagram of one embodiment of generating an image of a network device and any corresponding textual information in accordance with the invention. At 300, the NMA obtains information regarding the requested device. In one embodiment, the NMA obtains the requested device's OID (referred to herein as the requested device OID). However, the NMA can obtain information other than an OID, e.g., the device's serial number, provided that the information enables the NMA to locate any data available to the NMA that enables the NMA to generate an image of the device and any corresponding textual information. In one embodiment, the NMA contains a list of network devices and their OIDs and retrieves the OID for the requested device from the list. However, the OID for the requested device can be located in a different location, e.g., another location on the client, on the server, in another location in the network, etc.

Once the NMA obtains the information regarding the requested device, at 302 the NMA searches the client for a directory corresponding to the information regarding the requested device. In one embodiment, the NMA searches the client for an OID directory corresponding to the requested device OID. When the NMA locates the directory corresponding to the information regarding the requested device, at 304 the NMA locates within the directory one or more files relating to the requested device. In one embodiment, a file relating to the requested device is the requested device configuration file containing in XML format descriptions of specific attributes of the requested device and references to files containing images of the specific attributes.

At 306, the NMA accesses the file relating to the requested device. At 308, the NMA interprets the information in the file relating to the requested device. In one embodiment, the NMA interprets XML tags describing the specific attributes of the requested device, XML tags identifying the location of image files containing images of the specific attributes of the requested device, and XML tags identifying the location of any shared directories containing descriptions of shared attributes of the requested device. The locations of the shared directories are based on identifiers corresponding to the predefined naming convention, e.g., naming directories based on OIDs, specified in each configuration file of the different network devices containing particular shared attributes. For purposes of illustration and ease of explanation, certain remaining aspects of FIG. 3 will be described in specific terms of files containing XML tags describing specific attributes of the requested device and XML tags identifying the locations of image files and locations of shared directories. However, the information in the files relating to the requested device can contain additional, less or different information, e.g., textual information or a tabular display of attributes. At 310, the NMA accesses the image files identified by the XML tags in the requested device configuration file.

When the NMA does not locate a directory corresponding to the information regarding the requested device, at 305 the NMA searches the client for an alternative directory that provides information regarding an alternative device. Although in one embodiment the NMA searches for the alternative directory when the NMA does not locate a directory corresponding to the information regarding the requested device, in an alternative embodiment, the NMA can locate a directory corresponding to the information regarding the requested device which identifies the alternative directory.

In one embodiment, the alternative directory is a generic directory named according to the enterprise identifier of the manufacturer of the requested device. When the NMA obtains a requested device OID, the NMA indirectly obtains the manufacturer's enterprise identifier since the requested device OID is based on the manufacturer's enterprise identifier. However, the alternative directory can be another directory that contains information regarding an alternative device.

When the NMA locates the alternative directory, at 307 the NMA locates within the alternative directory one or more files relating to the alternative device. In one embodiment, the alternative device is a generic device produced by the manufacturer of the requested device. A generic device is representative of the type of network device produced by the manufacturer of the requested device.

In one embodiment, a file relating to the alternative device is a generic device configuration file containing in XML format descriptions of attributes of the generic device (referred to herein as generic attributes) and references to files containing images of the generic attributes. Although the image and any corresponding textual information generated using the generic attributes is not the image (or corresponding textual information) of the requested device, the generic attributes allow the NMA to generate a representative image and any corresponding textual information regarding the requested device.

At 309, the NMA accesses the file relating to the alternative device. At 311, the NMA interprets the information in the file relating to the alternative device. In one embodiment, the NMA interprets XML tags describing the generic attributes of the generic device, XML tags identifying the location of image files containing images of the generic attributes, and XML tags identifying the location of any shared directories containing descriptions of shared attributes of the generic device. For purposes of illustration and ease of explanation, certain remaining aspects of FIG. 3 will be described in specific terms of files containing XML tags describing generic attributes of the generic device and XML tags identifying the locations of image files and locations of shared directories. However, the information in the files relating to the alternative device can contain additional, less or different information, e.g., textual information or a tabular display of attributes. At 313, the NMA accesses the image files identified by the XML tags in the generic device configuration file.

Once the NMA determines either the specific attributes of the requested device, or the generic attributes of a generic device, at 314 the NMA searches for any shared directories identified by the XML tags in the requested device configuration file or in the generic device configuration file. As explained previously, shared attributes appear in multiple devices, and thus are shared by two or more network devices. Instead of appearing in the configuration files of each network device having the shared attribute, the description of the shared attribute is located in only one place, i.e., the shared configuration file. A reference to the shared directory is included in the configuration files of each network device that has the shared attribute. This avoids having to duplicate descriptions of the shared attribute. In addition, any modifications to shared attributes are made in only one place, which prevents errors that occurs when data stored in multiple files is modified, but the modification fails to occur in each file containing the data.

In one embodiment, the location of shared directories is provided in a configuration file. However, the NMA can be designed to locate descriptions of shared attributes without accessing information that provides the location. In addition, although in one embodiment the shared attributes and the generic attributes are located in different files, the shared attributes can be located in the same file as the generic attributes.

Once the NMA locates the shared directory, at 316 the NMA locates within the shared directory the shared configuration file containing, in XML format, descriptions of shared attributes and references to files containing images of the shared attributes. At 318, the NMA accesses the shared configuration file. At 320, the NMA interprets the XML tags describing the shared attributes and the XML tags identifying image files containing images of the shared attributes. At 322, the NMA accesses the image files identified by the XML tags in the shared configuration file.

At 324, the NMA uses the descriptions of the shared attributes, along with the descriptions of the specific attributes or generic attributes, as applicable, and the related images, to generate an image, i.e., an image of the requested device or a generic device, and any corresponding textual information, relating to the requested device. At 326, the client displays the image and any corresponding textual information. Although in one embodiment the descriptions of the attributes are used to generate an image of a network device and any corresponding textual information, the descriptions can be used for other purposes, e.g., generating a text document regarding the attributes of the network device.

When the NMA searches the client and can locate neither a directory corresponding to the information regarding the requested device nor an alternative directory, at 330 the NMA defaults to the default directory. At 332, the NMA locates a file within the default directory that enables the NMA to generate an image of devices (herein referred to as unknown devices) for which the NMA can locate neither a directory corresponding to the information regarding the requested device nor an alternative directory. In one embodiment, the NMA locates the default directory configuration file (referred to herein as the default configuration file). For purposes of illustration and ease of explanation, certain remaining aspects of FIG. 3 will be described in specific terms of files containing XML tags relating to unknown devices and XML tags identifying the locations of image files relating to unknown devices. However, the information in the files corresponding to the unknown device can contain additional, less or different information, e.g., textual information.

At 334, the NMA accesses the default configuration file and at 336 interprets XML tags relating to unknown devices, e.g., text stating "Unknown Device," text explaining that the NMA cannot determine the device type, or text containing the reason for the inability to identify the device. The NMA also interprets XML tags identifying an image file containing an image used in connection with unknown devices. At 338, the NMA accesses the image file identified by the XML tags in the default configuration file. At 340, the NMA generates an image of a default device and any corresponding textual information. At 342, the client displays the default device image and any corresponding textual information.

Figure 4:
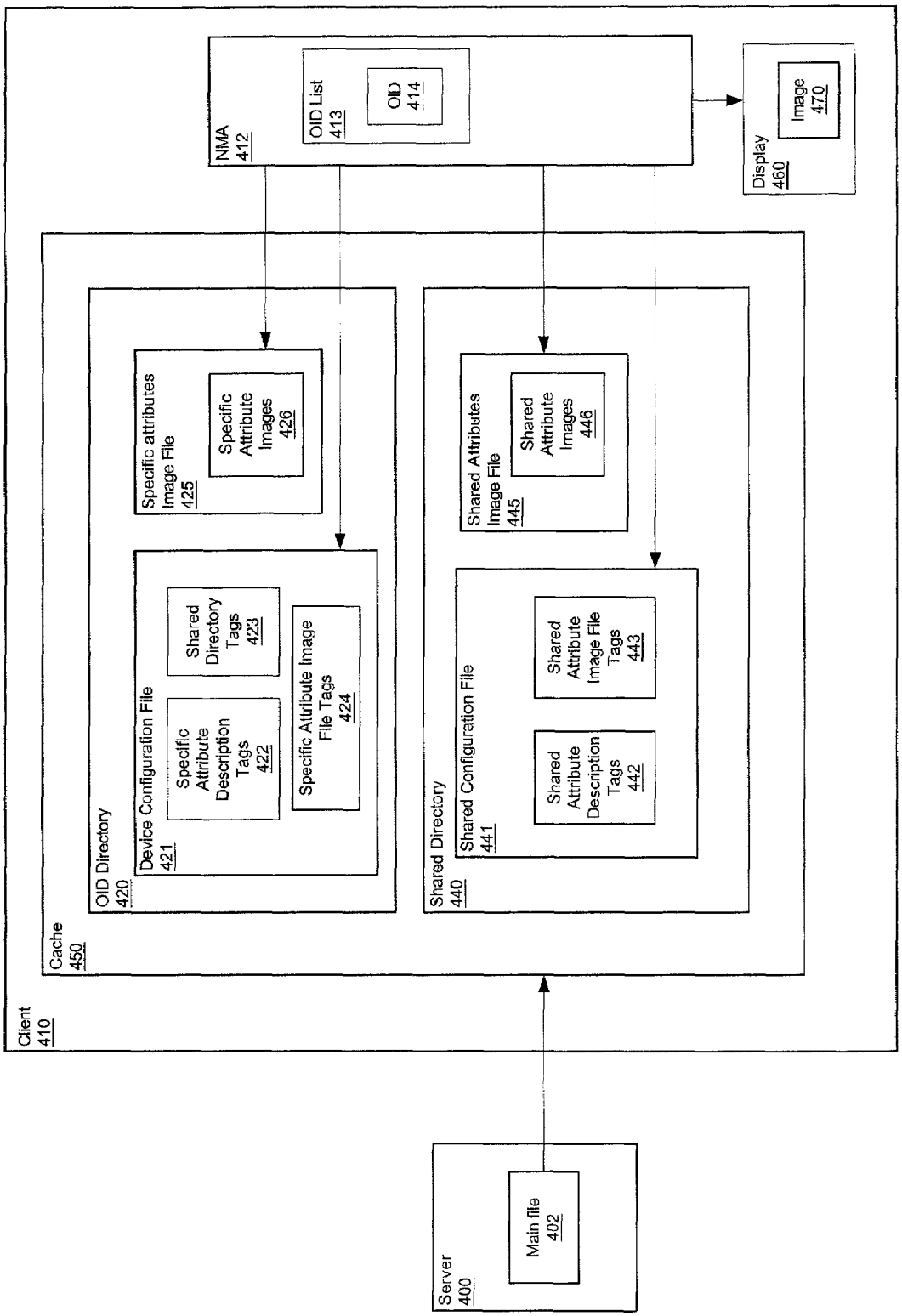
FIG. 4 is a block diagram of one embodiment of an NMA generating an image of a network device and any corresponding textual information in accordance with the invention.

FIG. 4 is a block diagram of an NMA generating an image of a network device in accordance with the invention. OID directory 420 containing device configuration file 421 and specific attribute image file 425, shared directory 440 containing shared configuration file 441 and shared attribute image file 445 initially exist on server 400. Other OID directories (not shown) containing other device configuration files (not shown) and other specific attribute image files (not shown), and other shared directories (not shown) containing other shared configuration files (not shown) and other shared attribute image files (not shown) initially exist on server 400. Configuration files describing attributes of manufacturers' generic devices (not shown), image files containing images of generic attributes (not shown) initially exist on server 400. A default configuration file (not shown) and a default image file both relating to network devices that do not have configuration files on server 400 initially exist on server 400. All configuration files are written in XML format and contain tags describing specific attributes, shared attributes, generic attributes and default attributes, as applicable, of network devices. All image files contain specific attribute image, shared attribute images, generic attribute images and default images, as applicable.

Server 400 is shut down and restarted, as a result of which OID directory 420, configuration file 421, specific attribute image file 425, shared directory 412, shared configuration file 441 and shared attribute image file 445 are packaged into main file 402. Client 410 running NMA 412 requests from server 400 information that will enable NMA 412 to generate an image of network devices and any corresponding text. As a result, main file 402 is downloaded from server 400 to client cache 450.

Client 410 receives from a user an image of the network device (not shown) whose attributes are described in OID directory 420. NMA 412, which contains OID list 413, retrieves OID 414. NMA 412 searches cache 450 for OID directory 420 identified according to OID 414. After locating OID directory 420, NMA 412 searches OID directory 420 for device configuration file 421. After locating device configuration file 421, NMA 412 accesses device configuration file 421 to interpret specific attribute description tags 422, specific attribute image file tag 423 identifying specific attribute image file 425, and shared directory tag 424 identifying shared directory 440.

After accessing OID directory 420, NMA 412 accesses specific attribute image file 425 and retrieves specific attribute images 452. After accessing specific attribute image file 425, NMA 412 accesses shared directory 440. In shared directory 440, NMA searches for shared configuration file 440. After locating shared directory configuration file 440, NMA 412 accesses shared directory configuration file 440 to interpret shared attribute description tags 442 and shared attribute image file tags 443 identifying shared attributes image file 445. NMA 412 accesses shared attribute image file 445 and retrieves shared attribute images 446. Using the data and images in OID directory 420 and shared directory 440, NMA 412 generates image and text 470. Client 410 displays image and text 470 on display 460. Although FIG. 4 shows server 400 and client 410 communicating directly, communications between server 400 and client 410 occurs over a network.

What is claimed is:

1. A method comprising:
  obtaining an identifier for a network device;
  locating a directory corresponding to the identifier;
  searching the directory for a file containing one or more descriptions of one or more specific attributes of the device;
  accessing the file to determine the one or more specific attributes of the device;
  generating a specific image of the device based on the one or more specific attributes of the device;
  displaying the specific image of the device; and locating an additional directory corresponding to a portion of the identifier for the device.

2. The method of claim 1, further comprising searching the additional directory for an additional file containing one or more descriptions of one or more shared attributes.

3. The method of claim 2, wherein generating a specific image of the device comprises generating a specific image of the device based on the one or more specific attributes and the one or more shared attributes.

4. The method of claim 1, further comprising locating an alternative directory corresponding to a portion of the identifier.

5. The method of claim 4, further comprising searching the alternative directory for an alternative file containing one or more descriptions of one or more attributes for an alternative device.

6. The method of claim 5, wherein the descriptions of the one or more attributes of the alternative device comprise one or more shared attributes of the alternative device.

7. The method of claim 6, further comprising generating an alternative image based on the one or more descriptions of the one or more attributes of the alternative device.

8. The method of claim 7, further comprising displaying the alternative image.

9. The method of claim 1, further comprising locating a default directory.

10. The method of claim 9, further comprising searching the default directory for a default file containing one or more descriptions of one or more default attributes of the device.

11. The method of claim 10, further comprising generating a default image based on the one or more default attributes.

12. The method of claim 11, further comprising displaying the default image.

13. The method of claim 1, wherein the identifier comprises, at least in part, an object identifier (OID) as issued by the International Telecommunications Union.

14. The method of claim 1, wherein the specific image comprises an abstract, diagnostic view of the device.

15. The method of claim 1, further comprising:
  a network server receiving from agents running on network devices data regarding the operating status of the network devices;
  the network server packaging the data regarding the operating status of the network devices; and
  the network server downloading the packaged information to a client where a user can access the information regarding the operating status of the network devices.

16. An article of manufacture comprising:
  a machine accessible medium including content that when accessed by a machine causes the machine to perform operations comprising;
  obtaining an identifier for a network device;
  locating a directory corresponding to the identifier;
  searching the directory for a file containing one or more descriptions of one or more specific attributes of the device;
  accessing the file to determine the one or more specific attributes of the device;
  generating a specific image of the device based on the one or more specific attributes of the device;
  displaying the specific image of the device; and
  locating an alternative directory corresponding to a portion of the identifier.

17. The article of manufacture of claim 16, wherein the machine-accessible medium further includes content that causes the machine to perform operations comprising searching the alternative directory for an alternative file containing one or more descriptions of one or more attributes for an alternative device.

18. The article of manufacture of claim 17, wherein the machine-accessible medium further includes content that causes the machine to perform operations comprising generating an alternative image based on the one or more descriptions of the one or more attributes of the alternative device.

19. The article of manufacture of claim 18, wherein the machine-accessible medium further includes content that causes the machine to perform operations comprising displaying the alternative image.

20. The article of manufacture of claim 16, wherein the machine-accessible medium further includes content that causes the machine to perform operations comprising locating a default directory.

21. The article of manufacture of claim 20, wherein the machine-accessible medium further includes content that causes the machine to perform operations comprising searching the default directory for a default file containing one or more descriptions of one or more default attributes of the device.

22. The article of manufacture of claim 21, wherein the machine-accessible medium further includes content that causes the machine to perform operations comprising generating a default image based on the one or more default attributes.

23. The article of manufacture of claim 22, wherein the machine-accessible medium further includes content that causes the machine to perform operations comprising displaying the default image.

24. The article of manufacture of claim 16, wherein the name of the corresponding directory comprises, at least in part, the identifier.

25. The article of manufacture of claim 16, wherein the identifier comprises a globally unique identifier.

26. The article of manufacture of claim 25, wherein the globally unique identifier comprises, at least in part, an object identifier (OID) as issued by the International Telecommunications Union.

27. The article of manufacture of claim 16, wherein the specific image comprises an abstract, diagnostic view of the device.

28. The article of manufacture of claim 16, wherein the one or more specific attributes of the device is selected from a group comprising:

the number of device ports;
the location of device ports;
the shape of device ports;
the type and shape of the device power supply; and
any other physical or operational characteristic or parameter of the device.

* * * * *